Figure 1:
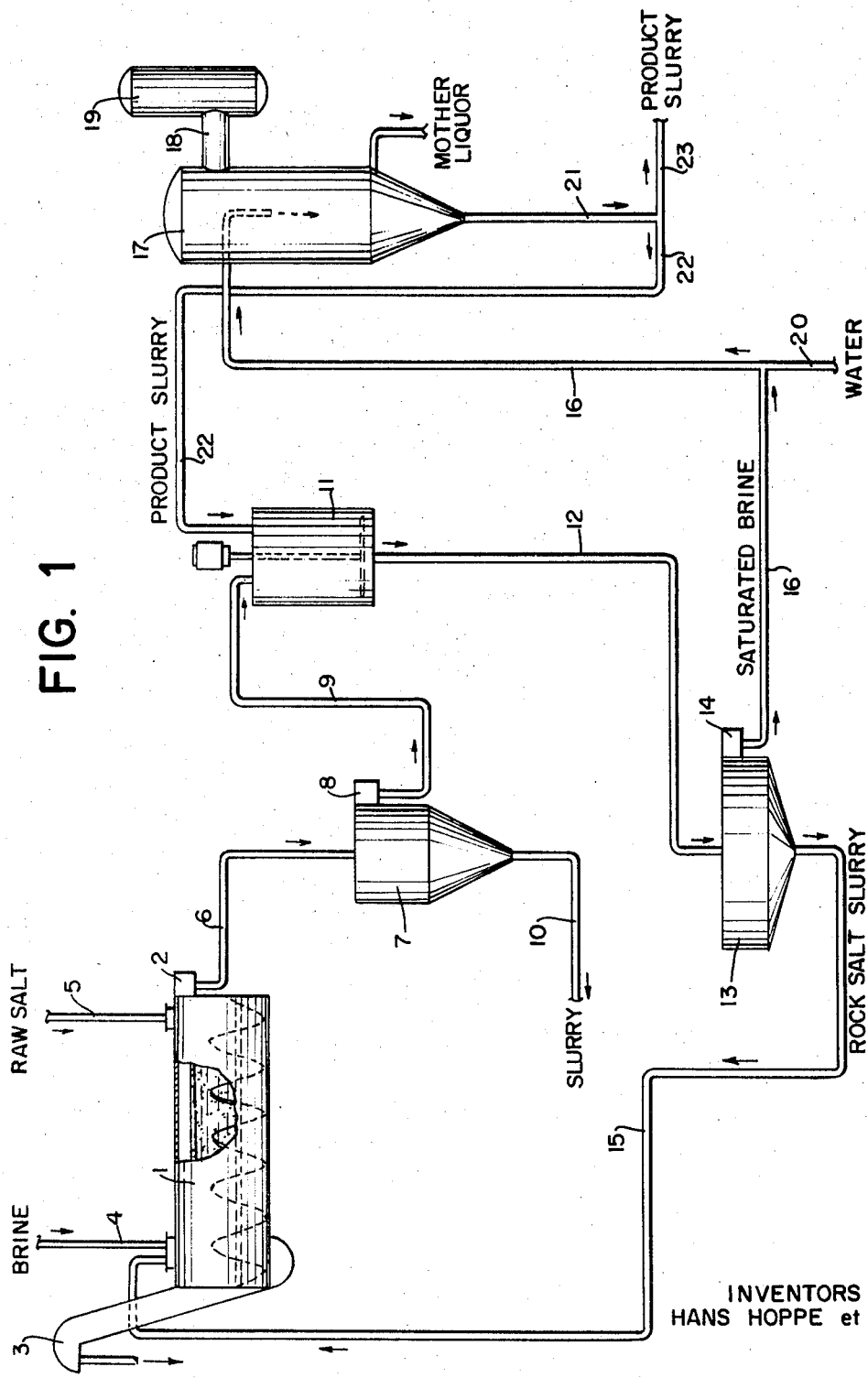

INVENTORS
HANS HOPPE et al

INVENTORS
HANS HOPPE et al

United States Patent Office 3,440,023
Patented Apr. 22, 1969

3,440,023
OBTAINING KCl FROM CRUDE SALTS BY EQUILIBRATING AND DILUTING PRIOR TO PRECIPITATION
Hans Hoppe, Heinz Scherzberg, Günter Döring, and Wolfgang Ulrich, Sondershausen, Germany, assignors to Kali-Forschungsinstitut, Sondershausen, Germany
Filed Sept. 2, 1966, Ser. No. 576,933
Int. Cl. B01d 9/02; C01d 3/04
U.S. Cl. 23—297        3 Claims This invention relates in general to a method for the manufacture of potassium chloride, and in particular to a method for making potassium salts, fertilizer and industrial salts, with a minimum content of 60% $K_2O$, from potasium minerals such as sylvinite, "hard salt" and carnallitic mixed salt. In the following, 60% $K_2O$ designates percent by weight throughout. According to the methods presently used for processing potassium crude salts, with the well known method of extraction at high temperature a salt will primarily crystallize with a content below 60% $K_2O$. This is caused by the relatively low saturation of the hot solution, as far as the potassium chloride is concerned, the supersaturation in sodium chloride, and the loss by the evaporation of solvent water, when cooling the hot solution in vacuum coolers.

Consequently, in the course of the cooling process of the hot solution, not the potassium chloride becomes precipitated, as it should be anticipated when cooling a solution saturated with NaCl and KCl and contining $MgCl_2$ and $MgSO_4$. The fact is that the crystallized precipitate shows a considerable contamination with NaCl.

It is the object of this invention to prepare a highly concentrated coarse potassium chloride with 60% $K_2O$, at reasonable cost. According to this invention, crude salts such as sylvinite, "hard salt" and carnallitic mixed salt are transformed into a coarse potassium chloride with a minimum of 60% $K_2O$, using the well known hot extraction process. It has been found that a crystallized product with a minimum content of 60% $K_2O$ can be directly obtained by saturating the clarified hot solution with potassium chloride, separating sodium chloride which has precipitated, adding an amount of water equivalent to the water lost by evaporation in the vacuum equipment, and subsequent cooling in the vacuum cooling plant.

It is the characteristic feature of the process according to this invention that the selective extraction of the sodium chloride from the crystallized precipitate, as practiced by the known methods, can be avoided. This is of great practical significance when considering the costs which are incurred by the removal of the sodium chloride from the solution and the diffculties due to the large amounts of water required.

According to the method of this invention, the potassium chloride required for saturation purposes is obtained by grading the crystallized precipitate. This increases considerably the coarse fraction of the final product. The saturation itself is achieved, using an excess of potassium chloride in appropriate vessels in which the solution is agitated vigorously; the dwell time is between about 5 and 10 minutes. In a clarification plant which follows, the sodium chloride precipitated during the saturation process is separated together with the excess of potassium chloride. The addition of specific clarifying agents increases the efficiency of the clarifying installation. It becomes thus possible to remove small amounts of residual sludge from the first clarification vessel which follows immediately after the dissolving tank.

The separated salt sludge is returned to the main dissolving tank. After clairification, sufficient quantities of water are added to the solution, so that no sodium chloride will crystallize in the course of the cooling process in a vacuum cooling plant and in subsequent coolers.

The precipitate formed when cooling has a minimum content of 60% $K_2O$. To remove the mother liquor which adheres to the crystals, the salt is washed during the dehydration process with part of the water which is added to the hot solution. The temperatures of the salt and of the water which is added to said hot solution must be adjusted in such a way that only very little cooling takes place.

The method can be carried out independently from the conditions of the cooling process as far as the subsequent cooling of the solution is concerned. Either by fractional crystallization by means of combined vacuum cooling in various stages and cooling in tanks or spray towers, or with simple vacuum cooling, a product with at least 60% $K_2O$ can be achieved, if the quantity of water which is added to the solution after the second clairification stage is adjusted to the total quantities of water actually lost by evaporation.

The method of this invention can also be applied to improve the decomposition products of poorer quality which are obtained in the decomposition of carnallite at low temperature. By not using part of the crystallized precipitate for saturating the solution with KCl, but rather the KCl-containing decomposition product from the decomposition of carnallite, the saturation effect in the solution is the same. However, it is advantageous to use the inferior quality decomposition sludge, for the "hard salt" process, so that it can finally be transformed into potassium chloride with 60% $K_2O$ without additional cost.

Figure 2:
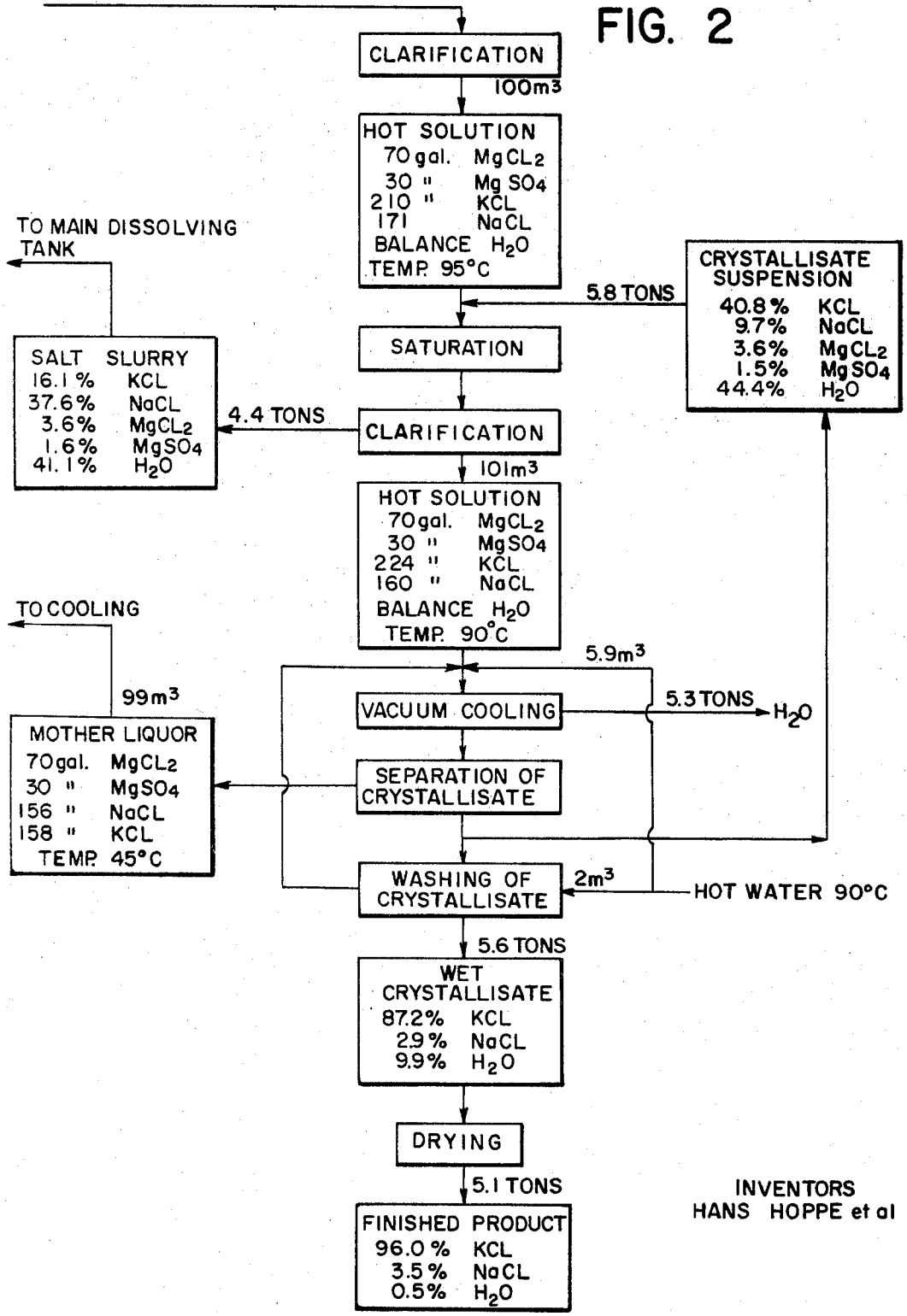

In the following, the invention will be more fully described in an example and with reference to the accompanying drawings in which FIG. 1 is a single flow sheet showing diagrammatically the apparatus for carrying out the inventive method; and FIG. 2 is a flow sheet, showing the quantities passing through every stage of the process.

Example 100 m.³ of hot, clarified brine, prepared by dissolving solid salt at high temperature, yields a final product of 5.1 tons with a content of more than 60% $K_2O$. To obtain a saturation to equilibrium, 1.4 tons KCl are required. These quantities are introduced in form of a slurry that originates when cooling the corresponding mother liquor with a solid content of 500 g./l. in a cycle between the steps of saturation and separation of crystals. The cycle effected by the excess KCl is completed over the main dissolution tank into which the clarified salt sludge is fed. The separated NaCl is removed from the process in clarification tank 1.

The method will now be described in detail with respect to FIG. 1 of the accompanying drawings.

In a dissolving tank 1, having an overflow 2, raw salt is continuously dissolved together with a brine. In this particular embodiment, the raw salt is passed through a conduit 5, and the brine through a conduit 4, both discharging into dissolving tank 1. Thereby, a hot solution rich in KCl is obtained, which leaves the dissolving tank through said overflow 2. The residue of the solution poor in KCl is removed from the dissolving tank by elevator means 3. The after-dissolving of the accumulated rock salt slurry is also carried out in the dissolving tank 1. The rock salt slurry which accumulates during the process is passed into the tank through a conduit 15. The hot solution is passed through a conduit 6 into settling vessel 7, which is provided with an overflow 8. In settling vessel 7, the suspended solid material is separated and is removed in form of slurry through conduit 10. The clarified solution is passed through pipe 9 into stirring vessel 11, wherein it is stirred together with a KCl sludge which is taken from a conduit 22. This sludge is passed through conduit 12, and is separated from the deposited rock salt sludge in settling vessel 13. The KCl-saturated solution passes through an overflow 14, and is moved through conduit 16 to vacuum cooling apparatus 17. The thickened rock salt sludge, which contains excess KCl, is passed through the conduit 15 into dissolving tank 1, as already mentioned before. The water which is withdrawn in said vacuum apparatus, is condensed in condenser 19, which is connected with the apparatus 17 by way of pipeline 18. A corresponding amount of water should be introduced into the solution before it enters the cooling system 17. The required water quantity will be supplied from a water source 20, and is introduced into the system through a conduit 16. The crystallized salt is removed from vacuum apparatus 17 together with the solution through a conduit 21. One part of the separated crystallisate is returned through a conduit 22 to stirring vessel 11 as a salt slurry, as already mentioned previously. The mother liquor will be after-cooled in a known manner. The crystallisate is also separated from the mother liquor, and washed and dried in a known manner. The quantities which pass through every stage in the system can be seen in flow sheet FIG. 2.

The embodiment of the invention particularly described is presented merely as an example of how the invention may be applied. Other embodiments, forms and modifications of the invention, coming within the proper scope of the appended claims, will of course readily suggest themselves to those skilled in the art.

What is claimed is:

1. A method of making potassium chloride, comprising the steps of dissolving solid crude potassium chloride containing salt in water, heating the solution and separating the hot solution from any remaining crude salt, adding potassium chloride to said purified hot solution, vigorously agitating said hot solution with said potassium chloride until saturated with potassium chloride and an equilibrium ratio is achieved corresponding to the prevailing temperature, separating sodium chloride which deposits from the hot saturated solution, adding water to said hot solution in an amount sufficient to preclude precipitation of any sodium chloride during the cooling step to follow, and cooling said hot saturated solution to precipitate potassium chloride, whereby the resulting potassium chloride deposit has a $K_2O$-content of at least 60%.

2. The method as described in claim 1 wherein the potassium chloride added to said purified hot solution is a potassium chloride-containing salt mixture.

3. The method as described in claim 1, wherein said potassium chloride added to said purified hot solution is fine-grained product obtained by grading the end product potassium chloride.

References Cited

UNITED STATES PATENTS

| | | | |
|---|---|---|---|
| 2,699,379 | 1/1955 | Luque | 23—302 X |
| 2,788,257 | 4/1957 | Duke | 23—302 X |
| 3,365,278 | 1/1968 | Kelly | 23—302 X |
| 2,685,438 | 8/1954 | Cross | 23—302 X |

FOREIGN PATENTS

| | | |
|---|---|---|
| 597,113 | 4/1960 | Canada. |
| 651,525 | 4/1951 | Great Britain. |

OTHER REFERENCES

Chem. Abs, "International," column 25 634, c thru g, vol. 54, # 22, Nov. 25, 1960.

NORMAN YUDKOFF, *Primary Examiner.*

S. J. EMERY, *Assistant Examiner.*

U.S. Cl. X.R.

23—89, 298, 301, 302